United States Patent
Ichikawa et al.

(10) Patent No.: US 9,139,100 B2
(45) Date of Patent: Sep. 22, 2015

(54) VEHICLE POWER SUPPLY APPARATUS

(75) Inventors: Shinji Ichikawa, Toyota (JP); Tomoyuki Mizuno, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 113 days.

(21) Appl. No.: 14/114,847

(22) PCT Filed: Jun. 9, 2011

(86) PCT No.: PCT/JP2011/063259
§ 371 (c)(1),
(2), (4) Date: Oct. 30, 2013

(87) PCT Pub. No.: WO2012/169050
PCT Pub. Date: Dec. 13, 2012

(65) Prior Publication Data
US 2014/0139182 A1    May 22, 2014

(51) Int. Cl.
*B60L 11/18* (2006.01)
*H02J 7/00* (2006.01)

(52) U.S. Cl.
CPC ......... *B60L 11/1812* (2013.01); *B60L 11/1838* (2013.01); *H02J 7/0004* (2013.01); *H02J 7/0027* (2013.01); *Y02T 10/7005* (2013.01); *Y02T 90/121* (2013.01); *Y02T 90/127* (2013.01); *Y02T 90/128* (2013.01); *Y02T 90/14* (2013.01); *Y02T 90/163* (2013.01)

(58) Field of Classification Search
CPC ... H02J 7/0027; H02J 7/0004; B60L 11/1838; B60L 11/1812; Y02T 90/163; Y02T 90/121; Y02T 90/128; Y02T 90/127; Y02T 90/14; Y02T 10/7005
See application file for complete search history.

(56) References Cited

U.S. PATENT DOCUMENTS

| | | | |
|---|---|---|---|
| 3,843,918 A * | 10/1974 | Rhyne | 320/160 |
| 3,976,987 A * | 8/1976 | Anger | 340/651 |
| 4,068,157 A * | 1/1978 | Bassett | 363/75 |
| 4,471,231 A | 9/1984 | Minami | |
| 4,639,610 A * | 1/1987 | Del Vecchio et al. | 307/83 |
| 8,421,381 B2 * | 4/2013 | Fukatsu | 318/139 |

FOREIGN PATENT DOCUMENTS

| | | |
|---|---|---|
| CN | 1792665 | 9/2010 |
| JP | A 59-153464 | 9/1984 |
| JP | A 4-340330 | 11/1992 |
| JP | A-7-107744 | 4/1995 |
| JP | A 10-112411 | 4/1998 |
| JP | A 2001-231169 | 8/2001 |
| JP | A 2010-187452 | 8/2010 |

* cited by examiner

*Primary Examiner* — Naum B Levin
(74) *Attorney, Agent, or Firm* — Oliff PLC

(57) ABSTRACT

A vehicular power supply apparatus includes a Scott transformer, a first output port and a second output port. The Scott transformer is configured to convert three-phase AC power supplied from a three-phase AC power source into first and second single-phase AC powers. The first output port is for supplying the first single-phase AC power to a vehicle. The second output port is for supplying the second single-phase AC power to a vehicle.

9 Claims, 8 Drawing Sheets

VEHICLE POWER SUPPLY APPARATUS

TECHNICAL FIELD

The present invention relates to a vehicular power supply apparatus, and particularly to a vehicular power supply apparatus capable of converting three-phase AC power supplied from a three-phase AC power source into single-phase AC power and supplying the single-phase AC power to a vehicle.

BACKGROUND ART

Japanese Patent Laying-Open No. 4-340330 (PTD 1) discloses a quick charger that charges a battery by a DC power source circuit for stepping down AC power and converting the AC power into DC power. In this quick charger, single-phase AC power from a single-phase AC power source is stepped down by a single-phase transformer, and DC power rectified by a rectification bridge is supplied to the battery (refer to PTD 1).

CITATION LIST

Patent Document

PTD 1: Japanese Patent Laying-Open No. 4-340330
PTD 2: Japanese Patent Laying-Open No. 2001-231169

SUMMARY OF INVENTION

Technical Problem

When a power supply apparatus is configured to be capable of simultaneously charging a plurality of vehicles by one AC power source, the use of a single-phase AC power source is not realistic. This is because the capacity of a single-phase transformer that converts single-phase AC power into DC power is generally about 20 k to 30 kVA, and thus, when the single-phase AC power source is used as a power source for a vehicle that requires high-power charging (particularly at the time of quick charging), the capacity is restricted to the capacity for approximately one output (one vehicle).

Large-capacity (e.g., 50 kVA or more) power conversion is required to allow simultaneous charging of a plurality of vehicles by one AC power source, and thus, the power source is limited to a three-phase AC power source. In this case, however, if a single-phase transformer is formed for each phase and output circuits for three outputs (three vehicles) are formed by using a three-phase three-wire transformer, only up to one third of the transformer capacity can be used for one output circuit at the time of charging only one vehicle, which is insufficient for vehicle charging that requires high-power charging.

Thus, the present invention has been made to solve the aforementioned problem, and an object thereof is to provide a vehicular power supply apparatus that can be adapted to high-power charging as well.

Solution to Problem

According to the present invention, a vehicular power supply apparatus is a vehicular power supply apparatus capable of converting three-phase AC power supplied from a three-phase AC power source into single-phase AC power and supplying the single-phase AC power to a vehicle, the vehicular power supply apparatus including: a Scott transformer; and first and second output units. The Scott transformer is configured to convert the three-phase AC power into first and second single-phase AC powers. The first output unit is for supplying the first single-phase AC power to a first vehicle. The second output unit is for supplying the second single-phase AC power to a second vehicle.

Preferably, the vehicular power supply apparatus further includes: a detection unit for detecting the first and second single-phase AC powers; and a control device. The control device executes power control such that the first and second single-phase AC powers become equal to each other, based on a detected value of the detection unit.

More preferably, the control device generates first and second power command values equalized each other, and outputs the first and second power command values to the first vehicle connected to the first output unit and the second vehicle connected to the second output unit, respectively. The first and second vehicles execute charging control in accordance with the first and second power command values, respectively.

Preferably, the vehicular power supply apparatus further includes: a third output unit connected in parallel to the first output unit; and a fourth output unit connected in parallel to the second output unit. The control device executes the power control such that a sum of power outputted from the first and third output units becomes equal to a sum of power outputted from the second and fourth output units.

More preferably, the vehicular power supply apparatus further includes a notification unit. The notification unit is for encouraging another vehicle to be connected to either one of the second and fourth output units when the vehicle is connected to either one of the first and third output units.

Preferably, the vehicular power supply apparatus further includes an output circuit for taking out commercial power from the Scott transformer.

More preferably, the output circuit is configured by a power line connected to a neutral point of a secondary winding of the Scott transformer, and an output line of the Scott transformer.

Preferably, the vehicular power supply apparatus further includes a rectification circuit for converting the first single-phase AC power into DC power and supplying the DC power from the first output unit to the first vehicle.

Advantageous Effects Of Invention

In the present invention, the three-phase AC power supplied from the three-phase AC power source is converted into the first and second single-phase AC powers by the Scott transformer, and the first and second single-phase AC powers are supplied from the first and second output units to the first and second vehicles, respectively. As a result, up to one half of the transformer capacity can be used for one output circuit at the time of charging only one vehicle. Therefore, according to the present invention, there can be provided a vehicular power supply apparatus that can be adapted to high-power charging as well.

DESCRIPTION OF EMBODIMENTS

Figure 1:
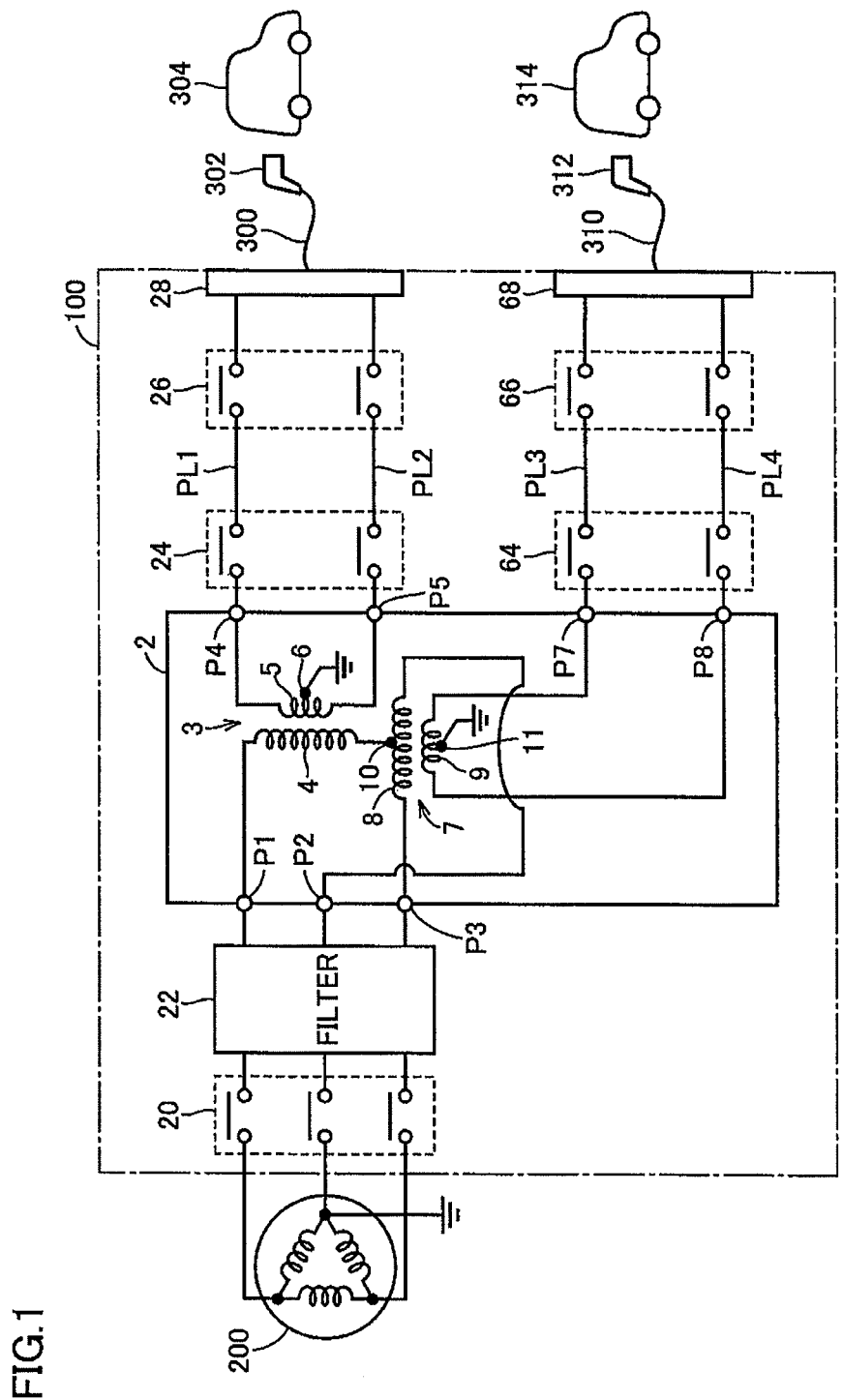
FIG. 1 is an overall configuration diagram of a vehicular power supply apparatus according to a first embodiment of the present invention.

Embodiments of the present invention will be described in detail hereinafter with reference to the drawings, in which the same or corresponding portions are denoted by the same reference characters and description thereof will not be repeated.

First Embodiment

FIG. 1 is an overall configuration diagram of a vehicular power supply apparatus according to a first embodiment of the present invention. Referring to FIG. 1, a vehicular power supply apparatus 100 includes a Scott transformer 2, interrupters 20, 24 and 64, a filter 22, relays 26 and 66, and output ports 28 and 68.

Scott transformer 2 includes a Teaser transformer 3 and a Main transformer 7. Teaser transformer 3 is configured by a primary winding 4 and a secondary winding 5. Main transformer 7 is configured by a primary winding 8 and a secondary winding 9. One end of primary winding 4 of Teaser transformer 3 is connected to a port P1 connected to the U phase of a three-phase AC power source 200. The other end of primary winding 4 is connected to a neutral point 10 of primary winding 8 of Main transformer 7. Secondary winding 5 of Teaser transformer 3 is connected to ports P4 and P5, and a neutral point 6 of secondary winding 5 is grounded. Primary winding 8 of Main transformer 7 is connected to a port P2 connected to the V phase of three-phase AC power source 200 and a port P3 connected to the W phase of three-phase AC power source 200. Secondary winding 9 of Main transformer 7 is connected to ports P7 and P8, and a neutral point 11 of secondary winding 9 is grounded.

This Scott transformer 2 converts three-phase AC power from three-phase AC power source 200 inputted from ports P1 to P3 into single-phase AC power of two systems. Then, first single-phase AC power generated by Teaser transformer 3 is outputted from ports P4 and P5, and second single-phase AC power generated by Main transformer 7 is outputted from ports P7 and P8. Voltages of the first and second single-phase AC powers are set in accordance with vehicles 304 and 314 that receive power supply from vehicular power supply apparatus 100, and are 200 V, for example.

Three-phase AC power source 200 supplies three-phase AC power to vehicular power supply apparatus 100. In this first embodiment, three-phase AC power source 200 is a power source that can absorb the power imbalance among the three phases caused by the load imbalance when either vehicle 304 or vehicle 314 is only connected to vehicular power supply apparatus 100, and is a commercial three-phase system power source, for example.

Interrupter 20 is arranged at a three-phase power line between three-phase AC power source 200 and Scott transformer 2. Interrupter 20 is a ground-fault interrupter, for example, and electrically interrupts a power path between three-phase AC power source 200 and Scott transformer 2 when a not-shown zero-phase current detector (ZCT) detects electric leakage. Filter 22 is arranged at the three-phase power line between three-phase AC power source 200 and Scott transformer 2, and suppresses intrusion of noise from three-phase AC power source 200 to vehicular power supply apparatus 100 and leakage of noise from vehicular power supply apparatus 100 to three-phase AC power source 200. Filter 22 is configured, for example, by an EMI filter.

Interrupter 24, power lines PL1 and PL2, relay 26, and output port 28 form a first output circuit that can supply power to vehicle 304 via a charging cable 300 connected to output port 28. Interrupter 24 is arranged between ports P4, P5 of Scott transformer 2 and power lines PL1, PL2. Interrupter 24 is also a ground-fault interrupter, for example, and electrically interrupts a power path between Scott transformer 2 and the first output circuit when the not-shown zero-phase current detector (ZCT) detects electric leakage.

Relay 26 is arranged between power lines PL1, PL2 and output port 28. When a prescribed power supply condition for permitting power supply from vehicular power supply apparatus 100 to vehicle 304 is satisfied, relay 26 is turned on and power supply from output port 28 to vehicle 304 becomes possible. Output port 28 is a power output unit for outputting, to vehicle 304, the single-phase AC power outputted from ports P4 and P5 of Scott transformer 2. By way of example, charging cable 300 is connected to output port 28, and by connecting a charging connector 302 provided at a tip of charging cable 300 to a charging inlet of vehicle 304, power is supplied from vehicular power supply apparatus 100 to vehicle 304. A plug provided at a tip of a charging cord that is extendible from vehicle 304 may be connected to output port 28.

In addition, interrupter 64, power lines PL3 and PL4, relay 66, and output port 68 form a second output circuit that can supply power to vehicle 314 via a charging cable 310 connected to output port 68. Interrupter 64 is arranged between ports P7, P8 of Scott transformer 2 and power lines PL3, PL4. Interrupter 64 is also a ground-fault interrupter, for example, and electrically interrupts a power path between Scott transformer 2 and the second output circuit when the not-shown zero-phase current detector (ZCT) detects electric leakage.

Relay 66 is arranged between power lines PL3, PL4 and output port 68. When a prescribed power supply condition is satisfied, relay 66 is turned on and power supply from output port 68 to vehicle 314 becomes possible. Output port 68 is a power output unit for outputting, to vehicle 314, the single-phase AC power outputted from ports P7 and P8 of Scott transformer 2. By way of example, charging cable 310 is connected to output port 68, and by connecting a charging connector 312 provided at a tip of charging cable 310 to a charging inlet of vehicle 314, power is supplied from vehicular power supply apparatus 100 to vehicle 314. A plug provided at a tip of a charging cord that is extendible from vehicle 314 may be connected to output port 68.

In this first embodiment, vehicular power supply apparatus 100 converts the three-phase AC power supplied from three-phase AC power source 200 into the single-phase AC power of two systems by Scott transformer 2. Vehicular power supply apparatus 100 has output ports 28 and 68, and can simultaneously supply power to two vehicles 304 and 314. In this vehicular power supply apparatus 100, Scott transformer 2 is used, and thus, the capacity for one vehicle can be increased as compared with the case of using the three-phase three-wire transformer. Specifically, in the case of using the three-phase three-wire transformer, the capacity is restricted to up to one third of the rated capacity of the three-phase three-wire transformer at the time of charging only one vehicle. In this vehicular power supply apparatus 100, however, Scott transformer 2 is used, and thus, up to one half of the rated capacity of Scott transformer 2 can be used at the time of charging only one vehicle. Therefore, according to this first embodiment, there can be realized a vehicular power supply apparatus that can also be adapted to high-power charging such as quick charging.

Second Embodiment

In the first embodiment, three-phase AC power source 200 is a power source that can absorb the power imbalance among the three phases caused by the load imbalance when only one vehicle is connected to vehicular power supply apparatus 100. However, if the aforementioned power imbalance among the three phases occurs when a power source having the limited capacity such as an emergency generator is used as the three-phase AC power source that supplies power to the vehicular power supply apparatus, there arise problems such as an influence of armature reaction and variations in output voltage in the generator used as the three-phase AC power source. Thus, this second embodiment describes such a configuration that the power balance among the three phases can be kept when the power source having the limited capacity is used as the three-phase AC power source.

Figure 2:
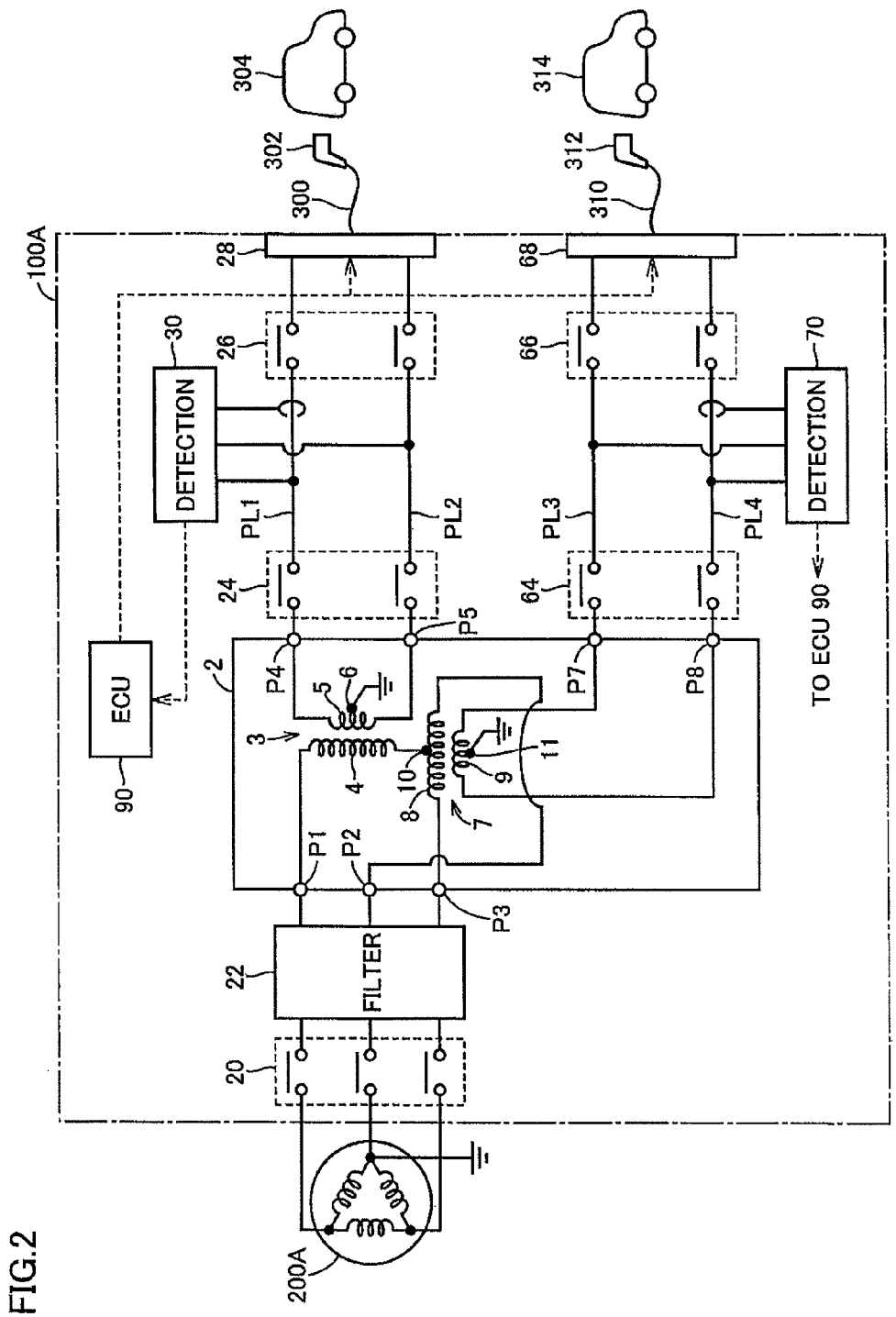
FIG. 2 is an overall configuration diagram of a vehicular power supply apparatus according to a second embodiment.

FIG. 2 is an overall configuration diagram of a vehicular power supply apparatus according to the second embodiment. Referring to FIG. 2, this vehicular power supply apparatus 100A is different from the configuration of vehicular power supply apparatus 100 according to the first embodiment as shown in FIG. 1 in that vehicular power supply apparatus 100A further includes detection units 30 and 70, and an ECU (Electronic Control Unit) 90.

Detection unit 30 detects a voltage between power lines PL1 and PL2 and a current flowing through power lines PL1 and PL2, i.e., a voltage and a current of power supplied to vehicle 304 connected to output port 28, and outputs the detected values to ECU 90. Detection unit 70 detects a voltage between power lines PL3 and PL4 and a current flowing through power lines PL3 and PL4, i.e., a voltage and a current of power supplied to vehicle 314 connected to output port 68, and outputs the detected values to ECU 90.

ECU 90 executes power control for supplying power from vehicular power supply apparatus 100A to vehicles 304 and 314 by software processing by a CPU (Central Processing Unit) executing the program stored in advance and/or by hardware processing by a dedicated electronic circuit. Specifically, ECU 90 generates power command values for vehicles 304 and 314 such that the power supplied to vehicle 304 connected to output port 28 becomes equal to the power supplied to vehicle 314 connected to output port 68, and outputs the generated power command values to vehicles 304 and 314.

As communication means for outputting the power command values from ECU 90 to vehicles 304 and 314, power line communication (PLC) via charging cables 300 and 310 may be used, or a pilot signal based on a control pilot circuit conforming to SAE J1772 (SAE Electric Vehicle Conductive Charge Coupler) in the United States of America or JEVS G 109 in Japan may be used, or wireless communication may be used.

A three-phase AC power source 200A supplies three-phase AC power to vehicular power supply apparatus 100A. In this second embodiment, three-phase AC power source 200A is a power source having the limited capacity, which cannot absorb the power imbalance among the three phases caused by the load imbalance when either vehicle 304 or vehicle 314 is only connected to vehicular power supply apparatus 100A, and is an emergency generator or the like used at the time of a power failure in the commercial system power source, for example.

Figure 3:
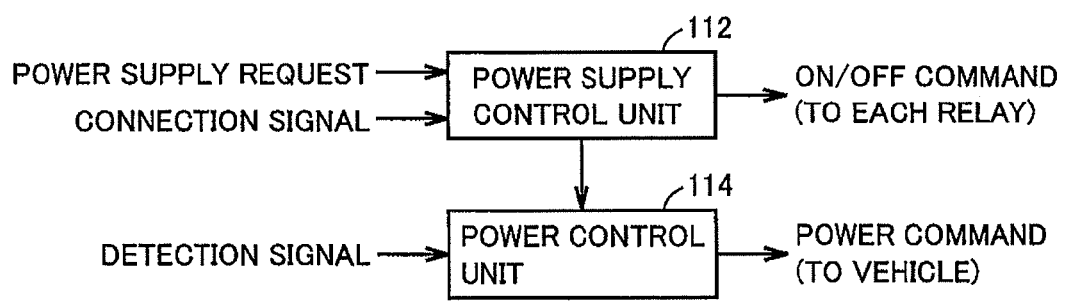
FIG. 3 is a functional block diagram of an ECU shown in FIG. 2.

FIG. 3 is a functional block diagram of ECU 90 shown in FIG. 2. Referring to FIG. 2 together with FIG. 3, ECU 90 includes a power supply control unit 112 and a power control unit 114. Power supply control unit 112 receives a connection signal indicating the connection state between charging connector 302 of charging cable 300 and vehicle 304 as well as a connection signal indicating the connection state between charging connector 312 of charging cable 310 and vehicle 314. Upon receiving a request for power supply from vehicular power supply apparatus 100A to vehicles 304 and 314 when charging connectors 302 and 312 are connected to vehicles 304 and 314, respectively, power control unit 112 outputs commands for turning on relays 26 and 66 to relays 26 and 66 and outputs a command to execute the power control to power control unit 114. When relays 26 and 66 are turned on, power supply from output ports 28 and 68 to vehicles 304 and 314 becomes possible.

Power control unit 114 receives current and voltage detection signals from each of detection units 30 and 70, and calculates the power supplied to vehicle 304 connected to output port 28 and the power supplied to vehicle 314 connected to output port 68, based on the detection signals. Upon receiving the command to execute the power control from power supply control unit 112, power control unit 114 generates the power command values for vehicles 304 and 314 such that the power supplied to vehicle 304 becomes equal to the power supplied to vehicle 314, and outputs the power command values to vehicles 304 and 314.

Figure 4:
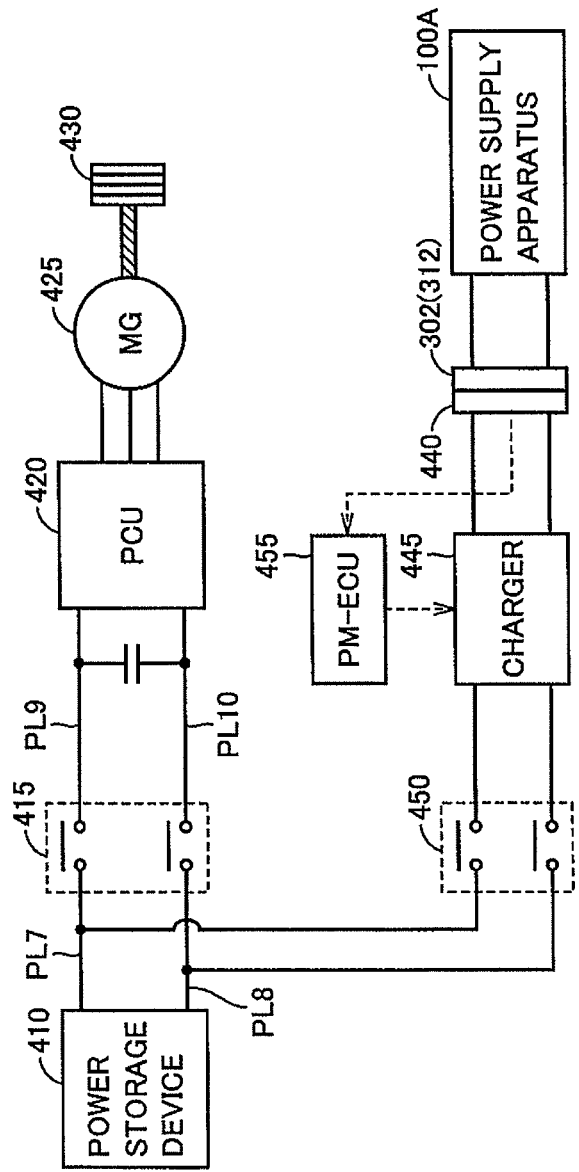
FIG. 4 is an overall block diagram schematically showing a configuration of a vehicle shown in FIG. 2.

FIG. 4 is an overall block diagram schematically showing a configuration of vehicle 304 (314) shown in FIG. 2. Referring to FIG. 4, vehicle 304 (314) includes a power storage device 410, a system main relay (hereinafter referred to as "SMR") 415, a PCU (Power Control Unit) 420, a motor generator 425, and a driving wheel 430. Vehicle 304 (314) further includes a charging inlet 440, a charger 445, an SMR 450, and a PM-ECU 455.

Power storage device 410 is a DC power source that stores power for running, and is configured, for example, by a nickel-metal hydride secondary battery, a lithium-ion secondary battery and the like. Power storage device 410 is charged by vehicular power supply apparatus 100A by using charger 445. At the time of braking of vehicle 304 (314) or reducing the acceleration on a downhill slope, power storage device 410 is also charged by receiving power generated by motor generator 425 from PCU 420. Power storage device 410 then outputs the stored power to PCU 420. Instead of the secondary battery, a large-capacitance capacitor can also be used as power storage device 410.

SMR 415 is provided between power storage device 410 and PCU 420. SMR 415 is turned on when a vehicle system is started to cause vehicle 304 (314) to run, and is turned off when power storage device 410 is charged by charger 445.

PCU 420 receives power supply from power storage device 410 and drives motor generator 425. At the time of braking of vehicle 304 (314) and the like, PCU 420 converts a voltage of the power generated by motor generator 425 that receives kinetic energy from driving wheel 430, and outputs the power to power storage device 410. PCU 420 is configured, for example; by a three-phase PWM inverter including switching elements for the three phases. A boost converter may be provided between the three-phase PWM inverter and power storage device 410.

Motor generator 425 is a motor generator that can operate in a power running mode and in a regenerative mode, and is configured, for example, by a three-phase AC synchronous motor generator including a rotor having a permanent magnet embedded therein. Motor generator 425 is driven by PCU 420, generates driving torque for running and drives driving wheel 430. At the time of braking of vehicle 304 (314) and the like, motor generator 425 receives the kinetic energy of vehicle 304 (314) from driving wheel 430 and generates power.

Charging inlet 440 is configured to be fittable into charging connector 302 (312) on the vehicular power supply apparatus 100A side. Charging inlet 440 receives power supplied from vehicular power supply apparatus 100A and outputs the power to charger 445. Instead of charging inlet 440, a charging plug configured to be connectable to an electrical outlet of vehicular power supply apparatus 100A may be provided.

Charger 445 is configured to receive the power from vehicular power supply apparatus 100A and charge power storage device 410. Specifically, based on a control signal from PM-ECU 455, charger 445 converts the power supplied from vehicular power supply apparatus 100A into charging power for power storage device 410. A charging relay 450 is provided between charger 445 and power lines PL7, PL8 arranged between power storage device 410 and SMR 415. Charging relay 450 is turned on when power storage device 410 is charged by vehicular power supply apparatus 100A (hereinafter also referred to as "external charging"), and is turned off when external charging is finished.

PM-ECU 455 controls the operation of charger 445 by software processing by a CPU executing the program stored in advance and/or by hardware processing by a dedicated electronic circuit. Specifically, at the time of external charging, PM-ECU 455 generates a control signal for operating charger 445 such that power storage device 410 is charged by vehicular power supply apparatus 100A in accordance with the power command value received from vehicular power supply apparatus 100A, and outputs the generated control signal to charger 445.

As described above, as communication means for receiving the power command value from vehicular power supply apparatus 100A, power line communication via charging cable 300 (310) may be used, or a pilot signal based on a control pilot circuit conforming to SAE J1772 (SAE Electric Vehicle Conductive Charge Coupler) in the United States of America or JEVS G 109 in Japan may be used, or wireless communication may be used.

As described above, in this second embodiment, detection units 30 and 70 are provided, and the power command values are generated by ECU 90 based on the detected values and are outputted to vehicles 304 and 314. ECU 90 generates the power command values such that the power supplied to vehicle 304 becomes equal to the power supplied to vehicle 314. Therefore, according to this second embodiment, even in the case of using three-phase AC power source 200A that cannot absorb the power imbalance among the three phases caused by the load imbalance, high-power charging is possible and the power balance in three-phase AC power source 200A can be maintained.

Third Embodiment

This third embodiment describes such a configuration that power can be supplied to a plurality of vehicles from each output system of a Scott transformer (each of a circuit that receives an output from ports P4 and P5 and a circuit that receives an output from ports P7 and P8), while keeping the power balance in a three-phase AC power source.

Figure 5:
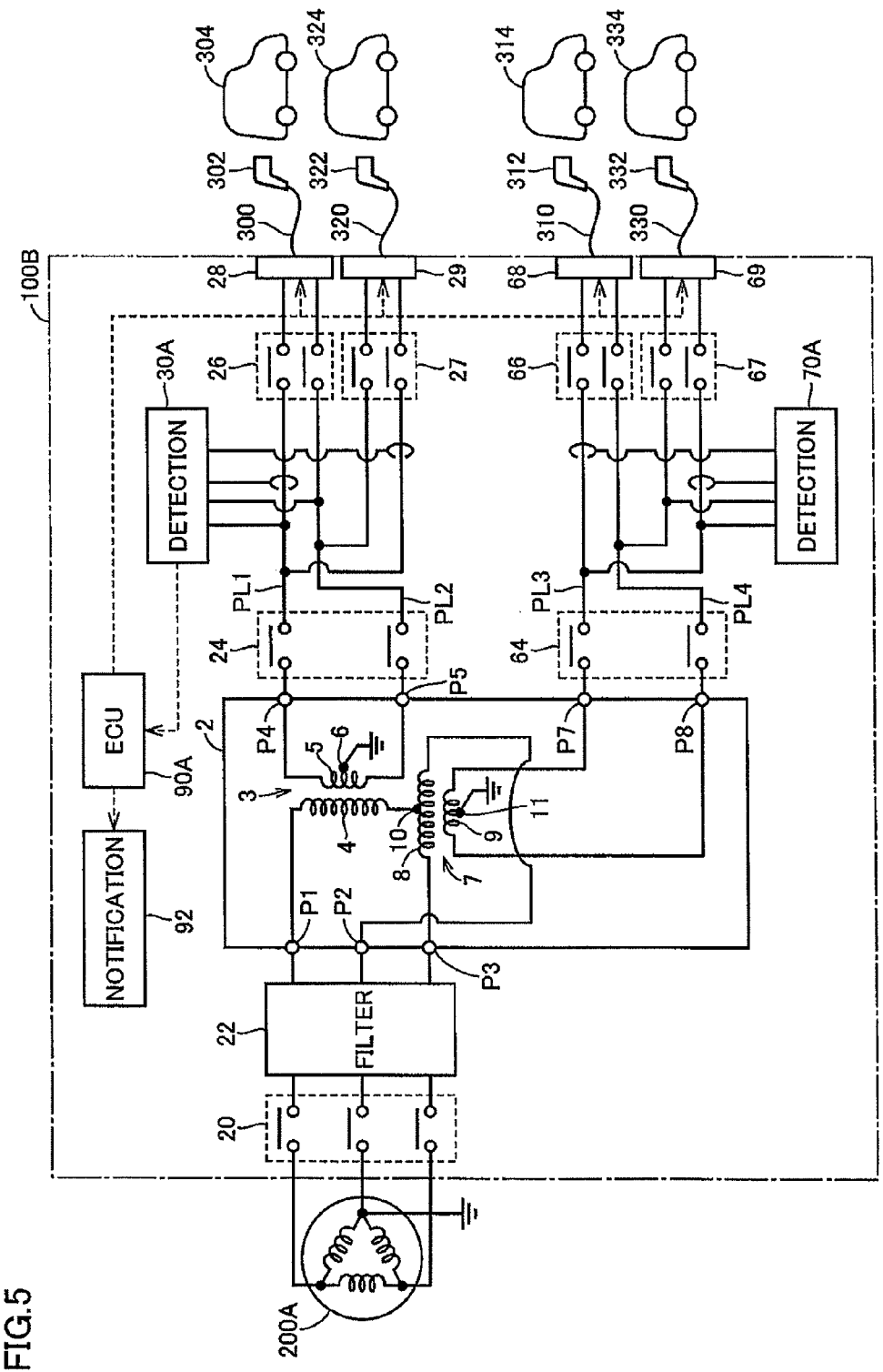
FIG. 5 is an overall configuration diagram of a vehicular power supply apparatus according to a third embodiment.

FIG. 5 is an overall configuration diagram of a vehicular power supply apparatus according to the third embodiment. This FIG. 5 typically shows such a configuration that power can be supplied to two vehicles from each output system of the Scott transformer. Referring to FIG. 5, this vehicular power supply apparatus 100B is different from the configuration of vehicular power supply apparatus 100A according to the second embodiment as shown in FIG. 2 in that vehicular power supply apparatus 100B further includes relays 27 and 67, output ports 29 and 69, and a notification unit 92, and includes detection units 30A and 70A and an ECU 90A instead of detection units 30 and 70 and ECU 90.

Relay 27 is arranged between power lines PL1, PL2 and output port 29. When a prescribed power supply condition for permitting power supply from vehicular power supply apparatus 100B to a vehicle 324 is satisfied, relay 27 is turned on and power supply from output port 29 to vehicle 324 becomes possible. Output port 29 is a power output unit for outputting, to vehicle 324, single-phase AC power outputted from ports P4 and P5 of Scott transformer 2.

Relay 67 is arranged between power lines PL3, PL4 and output port 69. When a prescribed power supply condition is satisfied, relay 67 is turned on and power supply from output port 69 to vehicle 334 becomes possible. Output port 69 is a power output unit for outputting, to vehicle 334, single-phase AC power outputted from ports P7 and P8 of Scott transformer 2.

Detection unit 30A detects a voltage between power lines PL1 and PL2 and a current flowing to output ports 28 and 29, i.e., a voltage and a current of power supplied from vehicular power supply apparatus 100B to each of vehicles 304 and 324, and outputs the detected values to ECU 90A. Detection unit 70A detects a voltage between power lines PL3 and PL4 and a current flowing to output ports 68 and 69, i.e., a voltage and a current of power supplied from vehicular power supply apparatus 100B to each of vehicles 314 and 334, and outputs the detected values to ECU 90A.

ECU 90A executes power control for supplying power from vehicular power supply apparatus 100B to vehicles 304, 314, 324, and 334. Specifically, ECU 90A generates power command values for vehicles 304, 314, 324, and 334 such that the sum of the power supplied to vehicles 304 and 324 connected to output ports 28 and 29, respectively, becomes equal to the sum of the power supplied to vehicles 314 and 334 connected to output ports 68 and 69, respectively, and outputs the generated power command values to vehicles 304, 314, 324, and 334.

All of vehicles 304, 314, 324, and 334 do not necessarily need to be connected. However, in order to keep the power balance in three-phase AC power source 200A, the second vehicle is connected to an output system different from an output system to which the first vehicle is connected. In other words, when vehicle 304 is connected, for example, the second vehicle is connected to either one of output ports 68 and 69.

In order to encourage the aforementioned connection, ECU 90A senses the connection situations of the vehicles to output ports 28, 29, 68, and 69, and generates a notification signal for encouraging the second vehicle to be connected to an output system different from an output system to which the first vehicle is connected, and outputs the notification signal to notification unit 92. By way of example, when only vehicle 304 is connected to vehicular power supply apparatus 100B, ECU 90A senses the connection situation, and generates a notification signal for encouraging the second vehicle to be connected to either one of output ports 68 and 69, and outputs the notification signal to notification unit 92.

In accordance with the notification signal received from ECU 90A, notification unit 92 notifies a user of vehicular power supply apparatus 100B about which port the vehicle should be connected to. By way of example, notification unit 92 is configured by an indicating lamp provided at each of output ports 28, 29, 68, and 69. When only vehicle 304 is connected to vehicular power supply apparatus 100B, for example, notification unit 92 causes the indicating lamps provided at output ports 68 and 69 to illuminate in accordance with the notification signal received from ECU 90A.

The remaining configuration of vehicular power supply apparatus 100B is as described with reference to FIG. 1.

Figure 6:
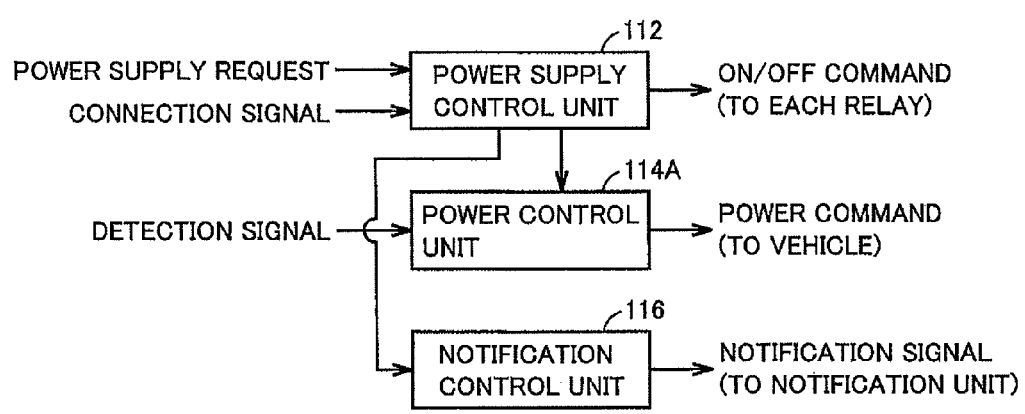
FIG. 6 is a functional block diagram of an ECU shown in FIG. 5.

FIG. 6 is a functional block diagram of ECU 90A shown in FIG. 5. Referring to FIG. 6, ECU 90A is different from the configuration of ECU 90 shown in FIG. 3 in that ECU 90A further includes a notification control unit 116, and includes a power control unit 114A instead of power control unit 114.

Notification control unit 116 receives the connection situations of the vehicles to output ports 28, 29, 68, and 69 from power supply control unit 112. When one vehicle is connected to any one of output ports 28, 29, 68, and 69, notification control unit 116 generates the notification signal for encouraging the second vehicle to be connected to an output port of an output system different from the output system to which the first vehicle is connected, and outputs the notification signal to notification unit 92.

Power control unit 114A receives current and voltage detection signals from each of detection units 30A and 70A. Based on these detection signals, power control unit 114A calculates first power supplied to vehicle 304 connected to output port 28, second power supplied to vehicle 324 connected to output port 29, third power supplied to vehicle 314 connected to output port 68, and fourth power supplied to vehicle 334 connected to output port 69. When no vehicle is connected to any output port, a current is zero, and thus, the power is calculated as zero. Upon receiving the command to execute the power control from power supply control unit 112, power control unit 114A generates power command values for the respective vehicles such that the sum of the first and second powers becomes equal to the sum of the third and fourth powers, and outputs the power command values to the vehicles connected to the output ports.

As described above, in this third embodiment, notification unit 92 is provided for encouraging the second vehicle to be connected to an output port of an output system different from the output system to which the first vehicle is connected, and thus, the power imbalance caused by concentration of a plurality of vehicles on one output system is prevented. Therefore, according to this third embodiment, power can be supplied to the larger number of vehicles while maintaining the power balance in three-phase AC power source 200A.

Fourth Embodiment

This fourth embodiment describes such a configuration that a vehicular power supply apparatus can also be used as a commercial power source (e.g., power source of AC 100 V).

Figure 7:
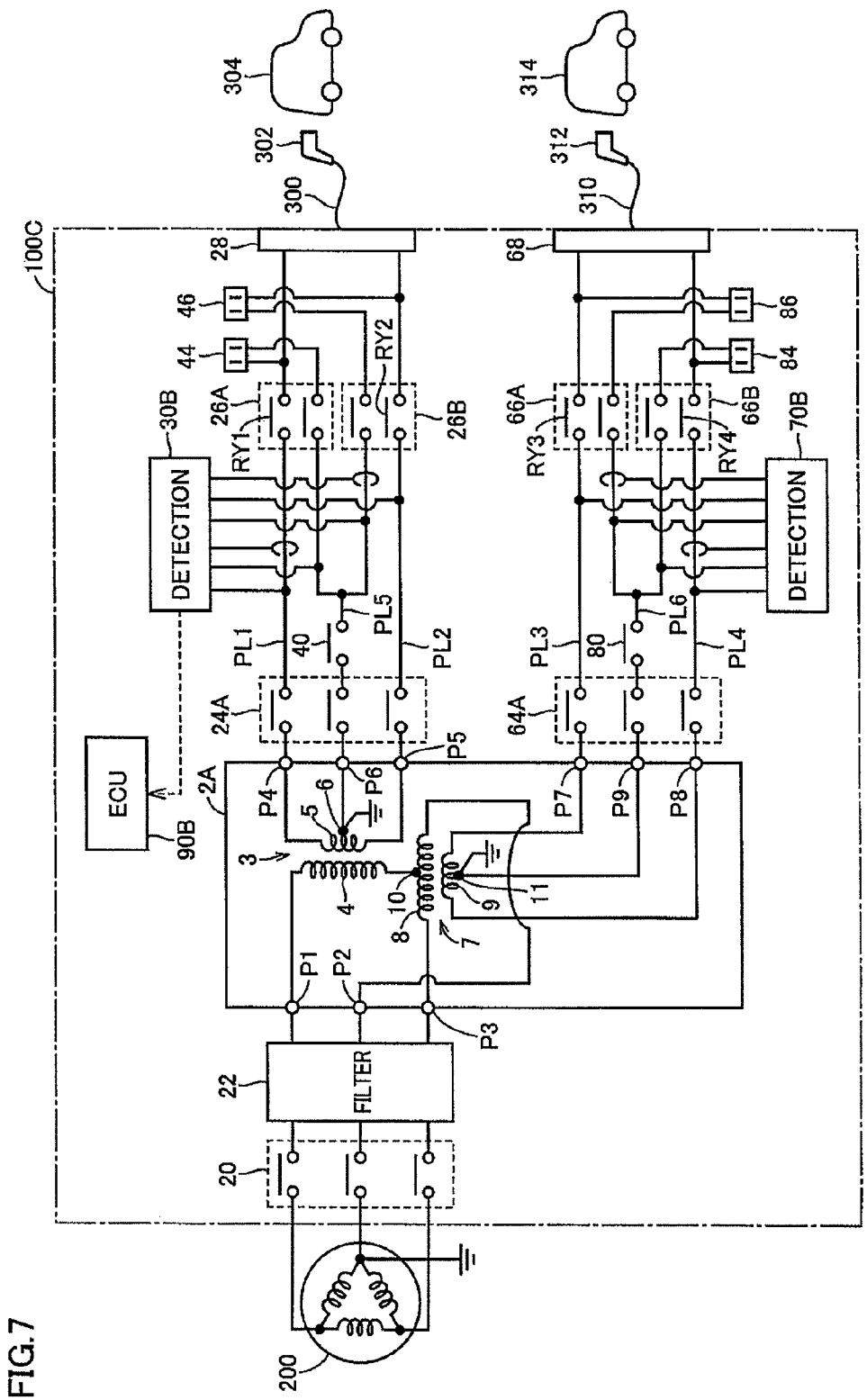
FIG. 7 is an overall configuration diagram of a vehicular power supply apparatus according to a fourth embodiment.

FIG. 7 is an overall configuration diagram of a vehicular power supply apparatus according to the fourth embodiment. Referring to FIG. 7, this vehicular power supply apparatus 100C includes a Scott transformer 2A, interrupters 20, 24A and 64A, filter 22, switching relays 40 and 80, relays 26A, 26B, 66A, and 66B, output ports 28 and 68, and electrical outlets 44, 46, 84, and 86. Vehicular power supply apparatus 100C further includes detection units 30B and 70B, and an ECU 90B.

Scott transformer 2A is different from the configuration of Scott transformer 2 shown in FIG. 1 in that Scott transformer 2A further includes ports P6 and P9. Port P6 is connected to neutral point 6 of secondary winding 5 of Teaser transformer 3. Port P9 is connected to neutral point 11 of secondary winding 9 of Main transformer 7.

Interrupter 24A is different from the configuration of interrupter 24 shown in FIG. 1 in that interrupter 24A is configured to be capable of further interrupting a power path between port P6 and switching relay 40. Switching relay 40 is arranged between port P6 and a power line PL5. Switching relay 40 is turned on when use of electrical outlets 44 and 46 is requested, and is turned off when electrical outlets 44 and 46 are not used.

Relay 26A is arranged between power lines PL1, PL5 and electrical outlet 44. Relay 26B is arranged between power lines PL2, PL5 and electrical outlet 46. Electrical outlets 44 and 46 are configured such that a power source plug of home electric appliances and the like can fit thereinto. Output port 28 is connected to power lines PL1 and PL2 via relays 26A and 26B. When a prescribed condition for permitting output from electrical outlets 44 and 46 is satisfied, relays 26A and 26B are turned on and use of electrical outlets 44 and 46 becomes possible. At the time of power supply to vehicle 304, a relay RY1 in relay 26A and a relay RY2 in relay 26B are turned on.

Interrupter 64A is different from the configuration of interrupter 64 shown in FIG. 1 in that interrupter 64A is configured to be capable of further interrupting a power path between port P9 and switching relay 80. Switching relay 80 is arranged between port P9 and power line PL6. Switching relay 80 is turned on when use of electrical outlets 84 and 86 is requested, and is turned off when electrical outlets 84 and 86 are not used.

Relay 66A is arranged between power lines PL3, PL6 and electrical outlet 86. Relay 66B is arranged between power lines PL4, PL6 and electrical outlet 84. Electrical outlets 84 and 86 are configured such that a power source plug of home electric appliances and the like can fit thereinto. Output port 68 is connected to power lines PL3 and PL4 via relays 66A and 66B. When a prescribed condition for permitting output from electrical outlets 84 and 86 is satisfied, relays 66A and 66B are turned on and use of electrical outlets 84 and 86 becomes possible. At the time of power supply to vehicle 314, a relay RY3 in relay 66A and a relay RY4 in relay 66B are turned on.

At the time of power supply from vehicular power supply apparatus 100C to vehicle 304, detection unit 30B detects a voltage and a current supplied to output port 28, and outputs the detected values to ECU 90B. At the time of use of electrical outlets 44 and 46, detection unit 30B detects a voltage and a current supplied to electrical outlets 44 and 46, and outputs the detected values to ECU 90B.

At the time of power supply from vehicular power supply apparatus 100C to vehicle 314, detection unit 70B detects a voltage and a current supplied to output port 68, and outputs the detected values to ECU 90B. At the time of use of electrical outlets 84 and 86, detection unit 30B detects a voltage and a current supplied to electrical outlets 84 and 86, and outputs the detected values to ECU 90B.

At the time of power supply from vehicular power supply apparatus 100C to vehicle 304, ECU 90B turns on relay RY1 in relay 26A and relay RY2 in relay 26B. When use of electrical outlets 44 and 46 is requested, ECU 90B turns on relays 26A and 26B. In addition, at the time of power supply from vehicular power supply apparatus 100C to vehicle 314, ECU 90B turns on relay RY3 in relay 66A and relay RY4 in relay 66B. When use of electrical outlets 84 and 86 is requested, ECU 90B turns on relays 66A and 66B.

Relays 26A, 26B, 66A, and 66B described above have been used in common both at the time of power supply to vehicles 304 and 314 and at the time of use of electrical outlets 44, 46, 84, and 86. However, a relay provided at a path for power supply to a vehicle and a relay provided at a path for power supply to an electrical outlet may be configured completely separately.

As described above, according to this fourth embodiment, the commercial power source (e.g., power source of AC 100 V) can be obtained from vehicular power supply apparatus 100C, and thus, user's convenience is improved.

Fifth Embodiment

This fifth embodiment describes a DC chargeable configuration.

Figure 8:
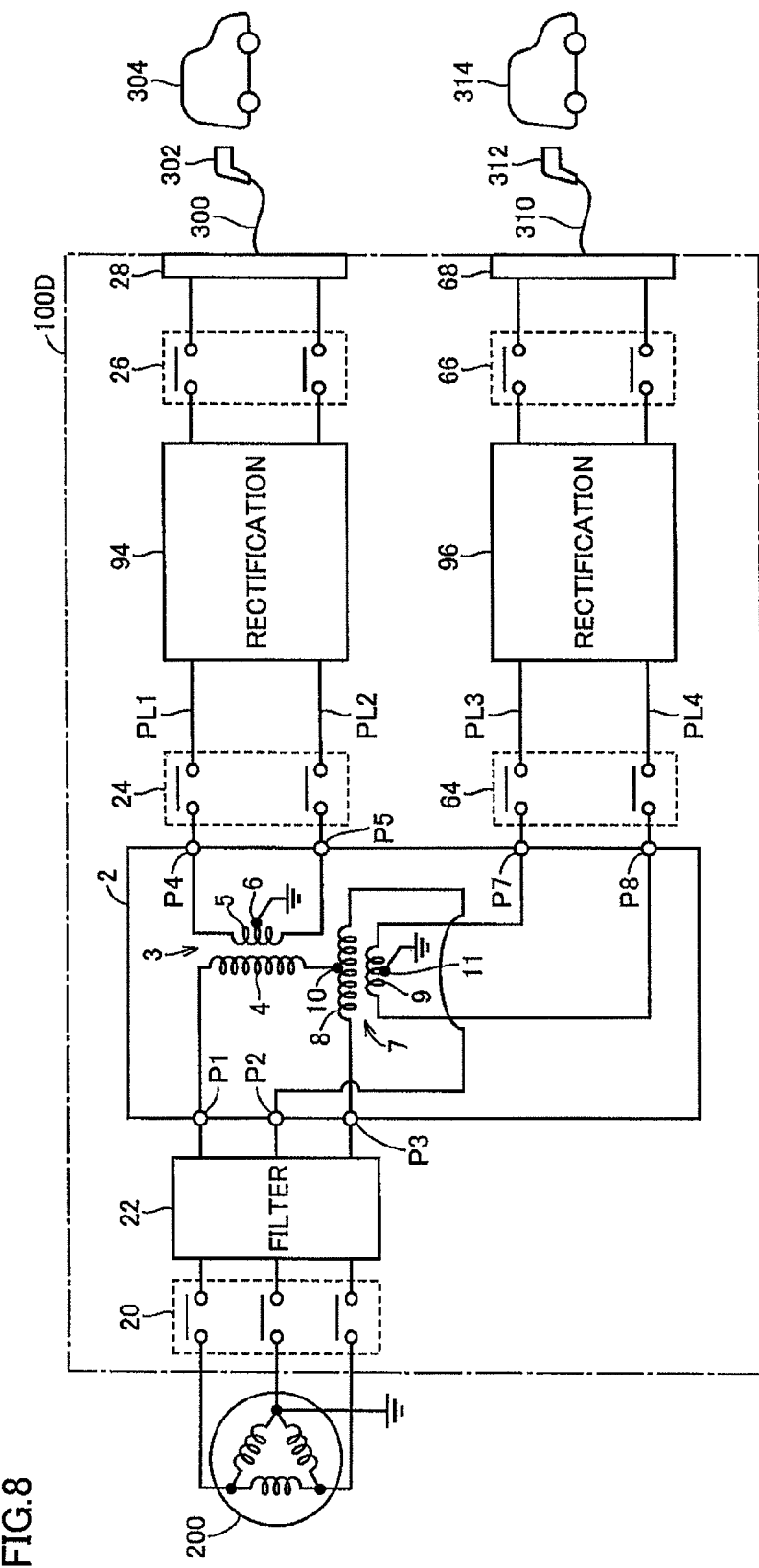
FIG. 8 is an overall configuration diagram of a vehicular power supply apparatus according to a fifth embodiment.

FIG. 8 is an overall configuration diagram of a vehicular power supply apparatus according to the fifth embodiment. Referring to FIG. 8, this vehicular power supply apparatus 100D is different from the configuration of vehicular power supply apparatus 100 according to the first embodiment as shown in FIG. 1 in that vehicular power supply apparatus 100D further includes rectification circuits 94 and 96.

Rectification circuit 94 is arranged between interrupter 24 and relay 26. Rectification circuit 94 rectifies single-phase AC power outputted from ports P4 and P5 of Scott transformer 2 into DC power, and outputs the DC power to output port 28. Rectification circuit 96 is arranged between interrupter 64 and relay 66. Rectification circuit 96 rectifies single-phase AC power outputted from ports P7 and P8 of Scott transformer 2 into DC power, and outputs the DC power to output port 68.

Although not particularly shown, only one of rectification circuits 94 and 96 may be included. In addition, switching between AC charging and DC charging may be made by providing a circuit that bypasses rectification circuits 94 and 96 to allow switching between use and disuse of rectification circuits 94 and 96.

As described above, according to this fifth embodiment, there can be realized a vehicular power supply apparatus that can also be adapted to high-power charging such as DC quick charging.

In the foregoing description, output ports 28 and 68 correspond to one example of "first output unit" and "second output unit" in the present invention, respectively, and ECU 90, 90A, 90B corresponds to one example of "control device" in the present invention. In addition, output ports 29 and 69 correspond to one example of "third output unit" and "fourth output unit" in the present invention, respectively.

It should be understood that the embodiments disclosed herein are illustrative and not limitative in any respect. The scope of the present invention is defined by the terms of the claims, rather than the foregoing description of the embodiments, and is intended to include any modifications within the scope and meaning equivalent to the terms of the claims.

REFERENCE SIGNS LIST 2, 2A Scott transformer; 3 Teaser transformer; 4, 8 primary winding; 5, 9 secondary winding; 6, 10, 11 neutral point; 7 Main transformer; 20, 24, 24A, 64, 64A interrupter; 22 filter; 26, 26A, 26B, 27, 40, 66, 66A, 66B, 67, 80, RY1 to RY4 relay; 28, 29, 68, 69 output port; 30, 30A, 30B, 70, 70A, 70B detection unit; 44, 46, 84, 86 electrical outlet; 90, 90A, 90B ECU; 92 notification unit; 94, 96 rectification circuit; 100, 100A to 100D vehicular power supply apparatus; 112 power supply control unit; 114, 114A power control unit; 116 notification control unit; 200, 200A three-phase AC power source; 300, 310, 320, 330 charging cable; 302, 312, 322, 332 charging connector; 304, 314, 324, 334 vehicle; 410 power storage device; 415, 450 SMR; 420 PCU; 425 motor generator; 430 driving wheel; 440 charging inlet; 445 charger; 455 PM-ECU; P1 to P9 port; PL1 to PL10 power line.

The invention claimed is:

1. A vehicular power supply apparatus capable of converting three-phase AC power supplied from a three-phase AC power source into single-phase AC power and supplying said single-phase AC power to a vehicle, the vehicular power supply apparatus comprising:
a Scott transformer configured to convert said three-phase AC power into first and second single-phase AC powers;
a first output unit for supplying said first single-phase AC power to a first vehicle;
a second output unit for supplying said second single-phase AC power to a second vehicle;
a detection unit for detecting said first and second single-phase AC powers; and
a control device that causes said first vehicle and said second vehicle to execute charging control such that said first and second single-phase AC powers become equal to each other, based on a detected value of said detection unit, wherein
said control device generates first and second power command values equalized to each other, and outputs said first and second power command values to said first vehicle connected to said first output unit and second vehicle connected to said second output unit, respectively, and
said first and second vehicles execute said charging control in accordance with said first and second power command values, respectively.

2. The vehicular power supply apparatus according to claim 1, further comprising
an output circuit for taking out commercial power from said Scott transformer.

3. The vehicular power supply apparatus according to claim 2, wherein
said output circuit is configured by a power line connected to a neutral point of a secondary winding of said Scott transformer, and an output line of said Scott transformer.

4. The vehicular power supply apparatus according to claim 1, further comprising
a rectification circuit for converting said first single-phase AC power into DC power and supplying said DC power from said first output unit to said first vehicle.

5. A vehicular power supply apparatus capable of converting three-phase AC power supplied from a three-phase AC power source into single-phase AC power and supplying said single-phase AC power to a plurality of vehicles, the vehicular power supply apparatus comprising:
a Scott transformer configured to convert said three-phase AC power into first and second single-phase AC powers;
a first output unit for supplying said first single-phase AC power to a first vehicle;
a second output unit for supplying said second single-phase AC power to a second vehicle;
a detection unit for detecting said first and second single-phase AC powers; and
a control device that causes said plurality of vehicles to execute charging control such that said first and second single-phase AC powers become equal to each other, based on a detected value of said detection unit;

a third output unit connected in parallel to said first output unit; and a fourth output unit connected in parallel to said second output unit, wherein said control device causes said plurality of vehicles to execute said charging control such that a sum of power outputted from said first and third output units becomes equal to a sum of power outputted from said second and fourth output units.

6. The vehicular power supply apparatus according to claim 4, further comprising a notification unit for encouraging another vehicle to be connected to either one of said second and fourth output units when the vehicle is connected to either one of said first and third output units.

7. The vehicular power supply apparatus according to claim 5, further comprising:

an output circuit for taking out commercial power from said Scott transformer.

8. The vehicular power supply apparatus according to claim 7, wherein said output circuit is configured by a power line connected to a neutral point of a secondary winding of said Scott transformer, and an output line of said Scott transformer.

9. The vehicular power supply apparatus according to claim 5, further comprising:

a rectification circuit for converting said first single-phase AC power into DC power and supplying said DC power from said first output unit to said first vehicle.

* * * * *